March 23, 1926.
O. G. LISSEN
DASHPOT
Filed July 30, 1925
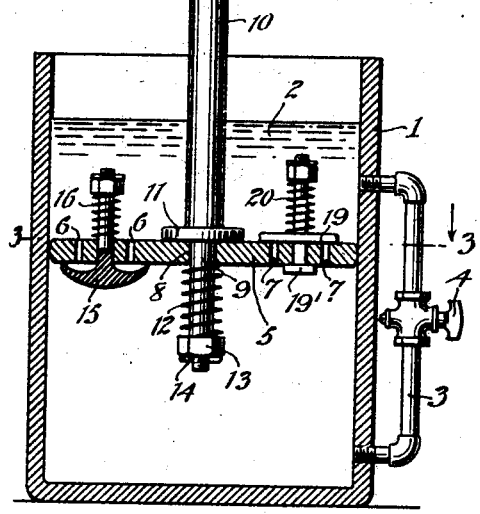
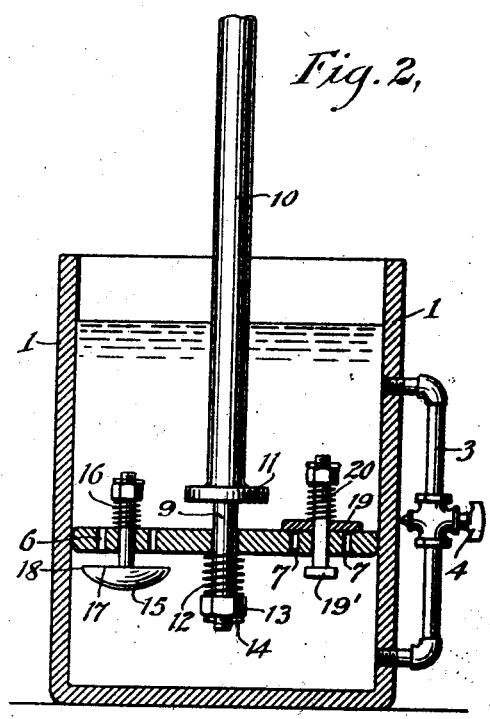
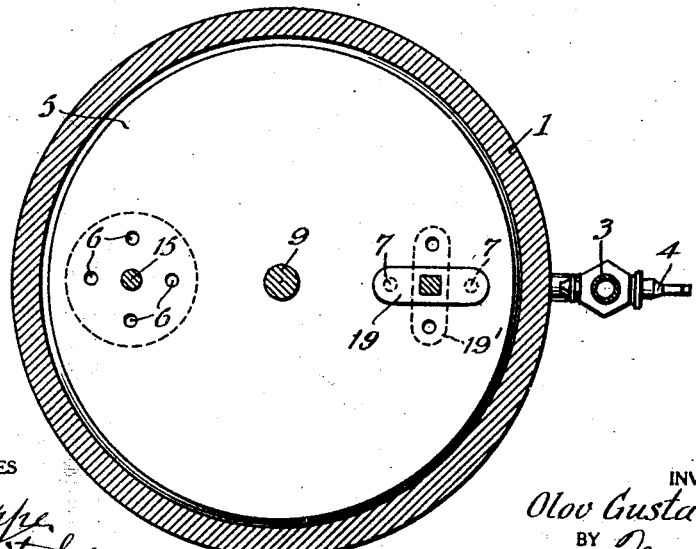
WITNESSES
INVENTOR
Olov Gustav Lissen
BY
ATTORNEYS Patented Mar. 23, 1926.

1,578,148

UNITED STATES PATENT OFFICE.

OLOV G. LISSEN, OF JERSEY CITY, NEW JERSEY.

DASHPOT.

Application filed July 30, 1925. Serial No. 47,119.

*To all whom it may concern:*

Be it known that I, OLOV G. LISSEN, a citizen of the United States of America, and a resident of Jersey City, in the county of Hudson and State of New Jersey, have invented a new and Improved Dashpot, of which the following is a full, clear, and exact description.

This invention relates to dash pots, and has for an object to provide an improved construction which may be of general use but which is particularly adapted for use with governors for engines.

Another object of the invention is to provide a dash pot wherein a loose motion is provided when a quick strong pull is given.

A further object of the invention is to provide a dash pot wherein an independent motion of the actuating rod is permitted when a quick pull is given, the same being associated with devices for gradually permitting an increase of speed of the piston of the dash pot.

In the accompanying drawings—

Figure 1 is a vertical sectional view through a dash pot disclosing an embodiment of the invention;

Fig. 2 is a view similar to Fig. 1 but showing the parts in the position assumed when a quick pull has been given;

Fig. 3 is a sectional view on an enlarged scale of Fig. 1, the same being taken on the line 3—3 of said figure.

Referring to the accompanying drawing by numerals, 1 indicates a container or body which is adapted to contain a liquid 2, as, for instance, oil. A by-pass 3 is provided, said by-pass having a hand-operated valve 4, whereby the flow through this by-pass may be regulated or stopped at will. Arranged in the body or container 1 is a piston 5 provided with a series of apertures 6 and a second series of apertures 7. An aperture 8 is provided centrally of the piston 5, said last-mentioned aperture accommodating a reduced extension 9 of the rod 10. The rod 10 is connected directly or through suitable links or other mechanism, to the governor of the engine, so that as the governor moves, the rod 10 will move up and down. The rod 10 is provided with an enlargement or shoulder 11 normally pressing against the upper surface of the piston 5. A spring 12 surrounds the reduced extension 9, said spring being held in place by a suitable nut 13 preferably locked against removal by a cotter pin 14. The spring 12 is of a strength to hold the rod 10 so that the enlargement 11 will be in continuous contact with the pinion 5 as said piston moves up and down in any usual manner for damping the action of the governor. When the rod 10 is given a sudden pull, as, for instance, when the main driving belt from the engine is broken, said rod will be quickly moved to the position shown in Fig. 2, whereby steam or other power may be shut off either completely or almost completely and without any delay. This action will, of course, compress the spring 12 and immediately start the piston 5 upwardly. The upward action of the piston 5 will continue until the parts assume substantially the position shown in Fig. 1.

It will be noted that during the usual up movement of the piston 5, or upon the emergency up movement, as indicated in Fig. 2, the relief valves 15 and 19' will open automatically as they are held closed normally by springs 16 and 20. The valve 15 is provided with a cup-shaped end 17 having comparatively sharp edges 18, whereby when it engages the piston 5, a substantially tight connection is provided. Coacting with the valve 15, is an oppositely facing valve 19, which normally closes the apertures 7, and the spring 20 acts to normally hold the valve 19 closed, but this valve will readily open against the action of the spring 20 when the piston 5 moves downwardly. Preferably the valve 19 is substantially rectangular, as shown in Fig. 3, so that only a certain number of the apertures 7 are closed. The spring 20 acts normally to maintain both the valves 19 and 19' closed but permits an opening of either valve whenever required. Preferably the spring 20 is stronger than the spring 16, so that the various apertures 7 are maintained closed as the piston 5 moves back and forth.

In operation, the spring 12 is of sufficient strength to cause the dash pot to act in the usual manner of ordinary dash pots now on the market, namely, to provide a yielding resistance as the piston 5 moves upwardly and downwardly. This action is common to all dash pots and naturally acts to prevent a quick movement of the governor or other device. In the present instance, if the arrangement is such that when the governor attempts to speed up suddenly by reason of some release, the spring 12 will be compressed and the power be entirely turned off or partly turned off very quickly. In this way, the arrangement which includes the spring 12 and reduced extension 9, presents a device which will take care of emergencies while ordinarily acting in the usual capacity of dash pots.

Preferably the spring 12 is the strongest, the spring 20 the second strongest, and the spring 16 the weakest, and also these springs are preferably arranged in such order that the valve 15 will function alone in the ordinary use of the device, but when greater action is necessary the valves 19 and 19' will function. When still greater or sudden action is required, the spring 12 will function so that under all circumstances there will be a proper resistance, and, at the same time, the construction will function properly to produce the desired damping action.

What is claimed is:

1. A dash pot, comprising a container adapted to contain a liquid, a piston arranged in the container and formed with several apertures, valve members facing in opposite directions for controlling said apertures so that there will be a relief as the piston moves in either direction, a rod connected with the piston, and means coacting with the rod for permitting a quick action of the rod in one direction independently of the piston.

2. A dash pot, comprising a container adapted to contain a quantity of liquid, a piston positioned in said container and provided with a valve structure opening in opposite directions as the piston is reciprocated so as to give relief in both directions, a piston rod associated with said piston, and means coacting with the piston rod and the piston for causing the piston to normally move with the piston rod but to permit the piston rod to move independently and quickly when a sudden pull is exerted thereon.

3. A dash pot comprising a container adapted to contain fluid, a piston arranged within the dash pot, oppositely opening valves carried by said piston, a rod slidingly mounted in said piston, said rod having a shoulder normally bearing against one face of the piston, and spring means acting on said rod and said piston for normally holding said shoulder against the piston, said spring means being of such strength as to resist compression during the normal movement of the piston but to be readily compressed when a quick, strong pull has been exerted on the rod, whereby said rod is caused to function slowly normally and to move quickly in emergency.

4. A dash pot comprising a container adapted to contain a quantity of liquid, a piston positioned in said container and provided with oppositely opening valves, a piston rod associated with said piston, and means coacting with the piston rod and the piston for causing the piston to normally move with the piston rod but to permit the piston rod to move independently and quickly when a sudden pull is exerted thereon.

OLOV G. LISSEN.